United States Patent [19]
Fritts et al.

[11] Patent Number: 6,063,344
[45] Date of Patent: May 16, 2000

[54] REMOVING ANIONS FROM ALKALINE SILICATE SOLUTIONS

[75] Inventors: Sharon D. Fritts, Youngstown; Walter Opalinski, Tonawanda; Joseph Guzzetta, Buffalo, all of N.Y.

[73] Assignee: Occidental Chemical Corporation, Dallas, Tex.

[21] Appl. No.: 09/323,192

[22] Filed: Jun. 1, 1999

[51] Int. Cl.⁷ .............................. C01G 3/02; C01G 9/02; C01G 45/02; C01G 53/04
[52] U.S. Cl. .............................. 423/24; 423/49; 423/100; 423/139; 423/604; 423/605; 423/622
[58] Field of Search .................................... 423/332, 339, 423/100, 24, 139, 49, 604, 605, 622

[56] References Cited

U.S. PATENT DOCUMENTS

| | | | |
|---|---|---|---|
| 3,857,924 | 12/1974 | Halasz | 423/339 |
| 4,230,679 | 10/1980 | Mahler et al. | 423/325 |
| 4,465,657 | 8/1984 | Spijker | 423/339 |

FOREIGN PATENT DOCUMENTS 10 939  12/1994  Romania.

Primary Examiner—Steven P. Griffin
Assistant Examiner—Michael Rhee
Attorney, Agent, or Firm—Anne E. Brookes; Richard D. Fuerle

[57] ABSTRACT

A method of removing $HMO_2^-$ anions from an aqueous silicate solution comprising contacting the solution with a cationic ion exchange resin, where M is manganese, zinc, copper, nickel, or a mixture thereof. The method is particularly applicable to solutions of sodium silicate or potassium silicate.

20 Claims, No Drawings

REMOVING ANIONS FROM ALKALINE SILICATE SOLUTIONS

BACKGROUND OF THE INVENTION

This invention relates to the removal of anions from alkaline silicate solutions using a cationic ion exchange resin. In particular, it relates to the removal of $HMO_2^-$ anions from $Na_2O$—$SiO_2$ or $K_2O$—$SiO_2$ solutions by contacting the solutions with a cationic ion exchange resin, where M is manganese, zinc, copper, or nickel.

Sodium silicate solutions have many industrial applications, some of which require high purity. In the electronics industry, for example, sodium silicate solutions are used to make colloidal silica. To prevent short circuiting, the solutions are required to have a very low metal content.

Sodium silicate solutions can be made by melting soda ash (sodium carbonate) with sand ($SiO_2$), by dissolving amorphous silica and sodium hydroxide in water, or by other techniques. The starting materials are mined or obtained from other sources and generally contain significant amounts of metals. Many of the metals can be removed by known techniques, but some metals, such as manganese and zinc, are difficult to remove to the ppb (parts per billion, by weight) level that is sometimes required.

SUMMARY OF THE INVENTION

We have discovered that certain metals that are in the form $HMO_2^-$ can be removed from highly alkaline silicate solutions by contacting the solutions with a cationic ion exchange resin, where M is Mn, Zn, Cu, or Ni. This is a surprising discovery because a cationic ion exchange resin would not be expected to remove an anion. We found, however, that not only are these anions removed by a cationic ion exchange resin, but they can be removed to the ppb level. While one would expect these anions to be removed by an anionic ion exchange column, strangely, it was found that an anionic ion exchange resin removed very little $HZnO_2^-$. The inventors do not understand why the invention works and are unable to postulate a possible explanation.

DESCRIPTION OF THE PREFERRED EMBODIMENTS

The anions removed by the process of this invention have the general formula $HMO_2^-$, where M is manganese, zinc, copper, or nickel. Other metals that also form $HMO_x^-$ anions, such as iron ($HFeO_2^-$) and zirconium ($HZrO_3^-$), were not removed to a significant extent in the process of this invention. Manganese and zinc are removed most effectively and copper and nickel are removed to a lesser extent. These anions form only under alkaline conditions—at a lower pH the metals form cations. Manganese becomes $HMnO_2^-$ at a pH over 11.4, zinc becomes $HZnO_2^-$ at a pH over 9, copper becomes $HCuO_2^-$ at a pH over 9.0, and nickel becomes $HNiO_2^-$ at a pH over 10. Thus, the invention is applicable to aqueous solutions that have a pH that is high enough for at least one of these metals to exist as the $HMO_2^-$ anion. The anions are typically present in amounts of about 0.1 to about 200 ppm.

The invention is particularly directed at silicate solutions of high pH (a pH over 8.9), that is, aqueous solutions of $Na_2O$ or $K_2O$, or a mixture thereof, with $SiO_2$. The weight ratio of $SiO_2$ to $Na_2O$ or $K_2O$ should be about 2 to about 3.8 as lower ratios are too alkaline (the $Na_2O$ and $K_2O$ form NaOH and KOH in solution, respectively), and it is difficult to make and dissolve the glass at higher ratios; the preferred ratio is about 3.2 to about 3.4. The solution can be concentrated to the solubility limit of the sodium or potassium silicate (about 47 wt % solids for sodium silicate), but it is preferable to dilute the solution to a lower viscosity so that it passes more easily through the cationic ion exchange resin. A viscosity of less than about 80 centipoises (cp) is preferred.

The solution is contacted with a cationic ion exchange resin. Any cationic ion exchange resin can be used such as, for example, those with aminophosphonic functional groups or iminodiacetic functional groups; resins having aminophosphonic functional groups are preferred. The resins are typically loaded with sodium or potassium ions. The solution can passed through a column or bed of the resin or a slurry of the solution and the resin can be formed. Sufficient resin should be used to remove all of the undesirable metal ions that can be removed using the process of this invention. If anions other than the $HMO_2^-$ anions are present, it may be necessary to use enough resin to remove those anions as well.

The following examples further illustrate this invention. In these examples, "467" and "C747" are resins having aminophosphonic functional groups, sold by Rohm & Haas, "Lewatit TP260" and "Lewatit OC1060" are resins having aminophosphonic functional groups, sold by Bayer, and "Lewatit TP207" and "Lewatit TP208" are resins having iminodiacetic acid functional groups, sold by Bayer. The values in the tables are in parts per million by weight (ppm).

EXAMPLE 1

A 50/50 by weight Grade 40 sodium silicate solution and Nanopure water (i.e., 18 mega-ohm resistivity) were mixed at room temperature and 200 mL of the mixture was fed to a 1.3 cm wide column filled with 25 cc of Duolite C467 resin. The first 100 mL of solution was discarded and the remaining solution was analyzed by ion conducted plasma (ICP). The following table gives the results:

| Element | Feed | Effluent |
| --- | --- | --- |
| Barium | 2.9 | 0.29 |
| Calcium | 6.0 | 3.5 |
| Zinc | 0.2 | 0.11 |

EXAMPLE 2

Example 1 was repeated using 160 mL of a 50/50 by volume Grade 40 sodium silicate solution. The following table gives the results:

| Element | Feed | Effluent |
| --- | --- | --- |
| Barium | 1.2 | 0.6 |
| Calcium | 7.5 | 4.6 |
| Zinc | 0.18 | 0.09 |

EXAMPLE 3

Example 1 was repeated at 60° C. using 170 mL of the sodium silicate solution at different cationic ion exchange resins and analyzing for more metals. The sodium silicate solution was diluted with 50% 18 Mega-ohm water (i.e., 18 mega-ohm resistivity) prior to being passed through the cationic ion exchange column. The following table gives the results:

| Metal | Feed | C747 | TP260 | TP208 | OC1060 | TP207 |
|---|---|---|---|---|---|---|
| Al | 62 | 67 | 62 | 61 | 62 | 63 |
| Ca | 3.6 | 1.5 | 1.5 | 1.8 | 1.4 | 1.6 |
| Cr | <0.09 | <0.09 | <0.09 | <0.09 | <0.09 | <0.09 |
| Cu | 0.12 | 0.068 | 0.095 | 0.092 | 0.066 | 0.11 |
| Fe | 22 | 21 | 19 | 22 | 23 | 19 |
| Mg | 5 | 4.1 | 4.8 | 4.9 | 4.9 | 4.9 |
| Mn | 0.3 | 0.064 | <0.024 | 0.16 | 0.091 | 0.11 |
| Ni | 0.22 | 0.3 | 0.13 | 0.19 | 0.14 | 0.22 |
| Ti | 15 | 13 | 15 | 16 | 15 | 15 |
| Zn | 0.26 | 0.094 | 0.032 | 0.035 | 0.035 | 0.046 |
| Zr | 5 | 5.1 | 4.9 | 5.2 | 5.4 | 5.1 |

The table shows that the process of this invention is very effective in removing manganese and zinc and, to a lesser extent, copper and nickel.

EXAMPLE 4-Comparative

Example 2 was repeated using an anionic ion exchange resin sold by Rohm & Haas as "Amberlite IRA900CI. The resin was converted to the hydroxyl form by soaking 25 mL of it in 50 mL of 5 wt % NaOH for 2 hours, decanting off the solution, adding an additional 50 mL of 5 wt % NaOH, and soaking overnight. The following table gives the results:

| Metal | Feed | Effluent |
|---|---|---|
| Aluminum | 66 | 57 |
| Calcium | 8.8 | 7.9 |
| Chromium | 0.09 | <0.05 |
| Copper | 0.05 | 0.07 |
| Iron | 20 | 20 |
| Magnesium | 4.5 | 3.8 |
| Manganese | <0.55 | <0.55 |
| Nickel | <0.088 | <0.088 |
| Zinc | 0.14 | 0.17 |
| Zirconium | 3.5 | 3.7 |

The table shows that the anionic ion exchange resin was not effective in removing copper and zinc. Due to the detection limits of the experiment, no conclusions can be reached as to the effectiveness of the anionic ion exchange resin in removing nickel and manganese.

We claim:

1. A method of removing $HMO_2^-$ anions from an aqueous silicate solution comprising contacting said solution with a cationic ion exchange resin, where M is manganese, zinc, copper, nickel, or a mixture thereof.

2. A method according to claim 1 wherein said aqueous silicate solution is a solution of sodium silicate.

3. A method according to claim 1 wherein said aqueous silicate solution is a solution of potassium silicate.

4. A method according to claim 1 wherein said aqueous silicate solution has a viscosity of less than about 80 centipoises.

5. A method according to claim 1 wherein said aqueous silicate solution is passed through a column of said cationic ion exchange resin.

6. A method according to claim 1 wherein said aqueous silicate solution is passed through a bed of said cationic ion exchange resin.

7. A method according to claim 1 wherein a slurry is formed of said aqueous silicate solution and said cationic ion exchange resin.

8. A method according to claim 1 wherein said aqueous silicate solution contains about 0.1 to about 200 ppm of said anions.

9. A method according to claim 1 wherein said aqueous silicate solution has a pH over 8.9.

10. A method according to claim 1 wherein M is Mn.

11. A method according to claim 1 wherein M is Zn.

12. A method of removing $HMO_2^-$ anions from an aqueous solution of sodium silicate or potassium silicate, where the weight ratio of $SiO_2$ to $K_2$ or $Na_2O$ in said aqueous solution is about 2 to about 3.8 and M is manganese, zinc, or a mixture thereof, and the concentration of said $HMO_2^-$ anions in said aqueous solution is about 0.1 to about 200 ppm, comprising passing said aqueous solution through a column containing a cationic ion exchange resin.

13. A method according to claim 12 wherein said solution has a pH greater than 9.

14. A method according to claim 12 wherein said solution has a viscosity of less than about 80 centipoises.

15. A method according to claim 12 wherein said solution is a solution of sodium silicate.

16. A method according to claim 12 wherein said solution is a solution of potassium silicate.

17. A method of removing $HMO_2^-$ anions from an aqueous solution of sodium silicate, where the weight ratio of $SiO_2$ to $Na_2O$ in said aqueous solution is about 3.2 to about 3.4, M is manganese, zinc, or a mixture thereof, and the concentration of said $HMO_2^-$ anions in said aqueous solution is about 0.1 to about 200 ppm, comprising passing said aqueous solution through a column containing a cationic ion exchange resin.

18. A method according to claim 17 wherein M is Mn and said solution has a pH greater than 11.4.

19. A method according to claim 17 wherein M is Zn and said solution has a pH greater than 9.

20. A method according to claim 17 wherein said solution has a viscosity of less than about 80 centipoises.

* * * * *